(12) United States Patent
Kuenkel et al.

(10) Patent No.: US 9,140,306 B2
(45) Date of Patent: Sep. 22, 2015

(54) ROTATIONAL MOVEMENT DAMPER

(75) Inventors: Rolf Kuenkel, Bad Berleburg (DE);
Walter Kornsteiner, Muntlix (AT);
Reinhold Lenherr, Staad (CH); Axel Tome, Göppingen (DE)

(73) Assignee: Ejot GmbH & Co. KG, Bad Laasphe (DE)

( * ) Notice: Subject to any disclaimer, the term of this patent is extended or adjusted under 35 U.S.C. 154(b) by 0 days.

(21) Appl. No.: 13/058,551

(22) PCT Filed: Sep. 21, 2009

(86) PCT No.: PCT/EP2009/006799
§ 371 (c)(1),
(2), (4) Date: Jun. 9, 2011

(87) PCT Pub. No.: WO2010/031583
PCT Pub. Date: Mar. 25, 2010

(65) Prior Publication Data
US 2011/0233012 A1      Sep. 29, 2011

(30) Foreign Application Priority Data

Sep. 22, 2008  (DE) .................. 10 2008 048 320

(51) Int. Cl.
*F16F 7/02*  (2006.01)
*F16D 7/02*  (2006.01)
*F16F 7/04*  (2006.01)

(52) U.S. Cl.
CPC .. *F16D 7/027* (2013.01); *F16F 7/04* (2013.01)

(58) Field of Classification Search
CPC ............... F16F 7/02; F16F 7/023; F16F 7/04; F16F 7/00; F16F 15/104; F16D 7/00; F16D 7/02; F16D 7/021
USPC .................................... 188/381, 110, 130, 83
See application file for complete search history.

(56) References Cited

U.S. PATENT DOCUMENTS 1,442,022 A    1/1923  Brooks
1,685,497 A    9/1928  Martin
(Continued)

FOREIGN PATENT DOCUMENTS

DE    1982094         3/1968
DE    2531903 A1      2/1977
(Continued)

*Primary Examiner* — Robert A Siconolfi
*Assistant Examiner* — Vu Q Nguyen
(74) *Attorney, Agent, or Firm* — Birch, Stewart, Kolasch & Birch, LLP

(57) ABSTRACT

The invention relates to a rotational movement damper (1) comprising an outer sleeve (2) and an axle which fits in the outer sleeve (2) and mounted to rotate in the outer sleeve. The axle comprises at least two discoidal flanges (7, 8, 17, 18) with flat flange surfaces (9, 10) and the same diameter, fitting in annular channels (12, 13, 14, 15) in the outer sleeve (2) such that the flanges contact with the planar flange surfaces (9, 10) thereof against the equally planar area on the counter surfaces of the annular channels (12, 13, 14, 15) unaffected by temperature variations and, on counter-rotation of the outer sleeve (2) and axle (3) act as a slipper clutch.

18 Claims, 2 Drawing Sheets

(56) References Cited

U.S. PATENT DOCUMENTS

| | | | |
|---|---|---|---|
| 1,761,870 A | | 6/1930 | Causan |
| 2,429,561 A | | 10/1947 | Miller |
| 2,606,431 A | | 8/1952 | Elgin |
| 2,977,779 A | | 4/1961 | Steinke et al. |
| 3,232,597 A | * | 2/1966 | Gaydecki .................. 267/219 |
| 3,396,557 A | | 8/1968 | Moores, Jr. |
| 4,083,060 A | * | 4/1978 | Lange ...................... 396/529 |
| 5,605,208 A | | 2/1997 | Friedrichsen et al. |
| 5,865,278 A | | 2/1999 | Wagner |
| 6,129,186 A | | 10/2000 | Blake, III |

FOREIGN PATENT DOCUMENTS

| | | |
|---|---|---|
| DE | 2700812 A1 | 7/1978 |
| DE | 3423726 A1 | 3/1985 |
| DE | 9420646 U1 | 2/1995 |
| DE | 19611725 C1 | 11/1997 |
| DE | 19915848 A1 | 10/1999 |
| DE | 20108894 U1 | 10/2001 |
| DE | 69908753 T2 | 4/2004 |
| DE | 102008015018 A1 | 9/2009 |
| FR | 1365805 | 7/1964 |
| GB | 2147686 A | 5/1985 |

* cited by examiner

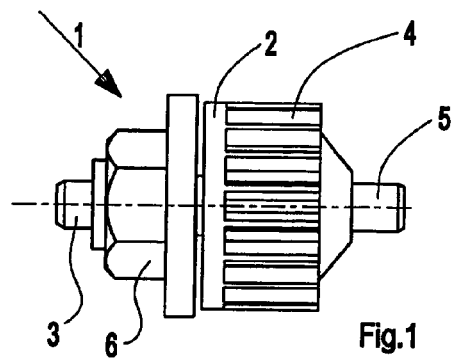
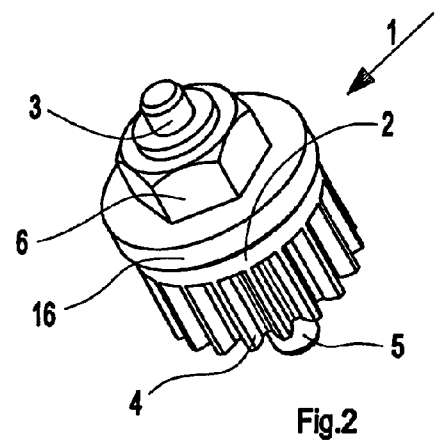
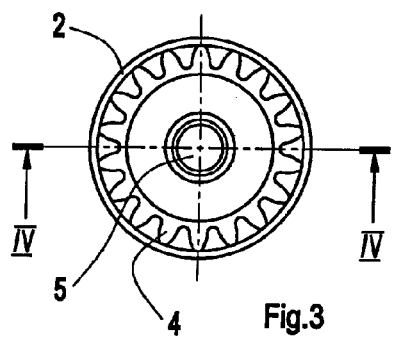
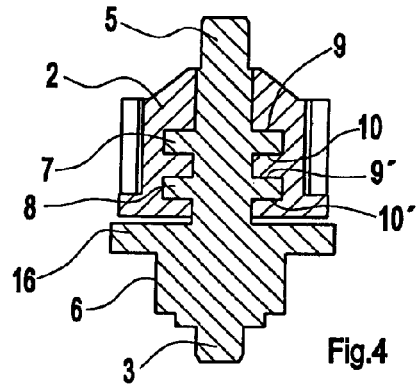
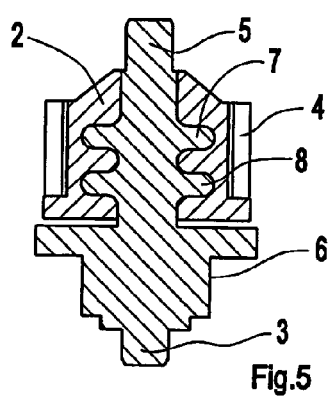
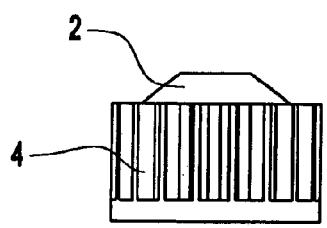

ROTATIONAL MOVEMENT DAMPER

The invention relates to a rotational movement damper having an outer sleeve and an axle which fits in the outer sleeve and is mounted to rotate in the outer sleeve.

Rotational movement dampers are frequently used, for example together with arbitrarily moved construction parts, which, upon their use, are pivoted from a rest position into an operating position and which spring back out of this operating position when the operating sequence is finished. This may be about glove compartments in motor vehicles or handle grip which are to facilitate the boarding and which are moved into an operating position upon gripping the same, from which position they than swing back into their rest position under spring tension. This swinging-back should happen in a delayed fashion among others because of avoiding hard noises, and it should also be dampened with respect to its rotational movements, for which purpose already rotational movement dampers are used which, on the one hand, allow an easy movement from the rest position into the operating position and which swing back out of the operating position, however, with a dampened movement. These movement dampers usually operate with some kind of fluid which may be constricted with respect to its fluid flow and, thereby, causes the function as rotational movement damper.

It is the object of the present invention to design the construction of such rotational movement dampers particularly simple and secure in operation. According to the invention, this is achieved thereby that the axle comprises at least two discoidal flanges with flat flange surfaces and the same diameter, fitting in annular channels in the outer sleeve such that the flanges contact with the planar flange surfaces thereof against the equally planar area of the counter surfaces of the annular channels unaffected by temperature variations and, on counter-rotation of the outer sleeve and axle act as a slipper clutch.

This construction gets by just with two constructional elements connected to each other, i.e. the outer sleeve and the axle supported therein. Therein, the two constructional elements of the movement damper, i.e. the outer sleeve and the axle, adapted to each other such that, upon a mutual rotation of the elements with respect to each other, a more or less substantial friction has to be overcome between the two elements. This results, for the mutual rotation of the two elements with respect to each other, in the effect of a slipper clutch which is able to slip upon going beyond a certain torque, i.e. to allow a rotational movements of the two elements with respect to each other. With respect to the above-mentioned application examples, i.e. a rotatable handle grip, the rotational movement damper of the invention allows the following movement of the handle grip or respectively effects the movement thereof in the following way. Upon the handle grip swinging open fast, both elements of the rotational movement damper slip past each other, i.e. the slipper clutch is slipping through. Upon the subsequent releasing of the handle grip, which usually is rotatably mounted against a spring and always tends to return to its original position under the action of the spring, the spring which causes the swinging-back of the movement damper effects a corresponding movement of the handle grip which is, however, counteracted by the rotational movement damper in that the rotational movement damper, because of its slipper clutch action, delays the back movement of the handle grip caused by the tension of the spring with its friction since the tension of the spring overcomes this friction, and only slowly returns into its rest position whereby the desired movement dampening has occurred. The same effect of the movement damper can naturally also be applied to other constructional elements with respect to which, for a alternating motion, a corresponding rotational movement with respect to the rotational movement damper is effected such that the return movement is correspondingly delayed under the effect of the friction of the slipper clutch.

The slipper clutch action may be achieved in a particularly simple way thereby that, of both constituents of the movement damper (outer sleeve and axle), at least one part consists out of plastics which is adapted to the other part by injection molding. Because of this construction, a direct fitting of the mold fitted part to the other part is automatically obtained and, thereby, also upon rotation of the two parts with respect to each other, a sufficient friction is obtained in order to either cause pulling along upon movement with a low torque or to get into a slipping motion with a higher torque whereby the effect of the slipper clutch is achieved.

The effect of the slipper clutch is further promoted in particular thereby that the head end of the flange is rounded. In this case smaller friction tension peaks at any edges of the flanges with respect to the ring channels are obtained such that the effect of the friction is concentrated essentially to the flat flange surfaces and the counter surfaces of the ring channels.

An embodiment of the invention is shown in the figures.

FIG. 1 shows the movement damper in the combination of both parts fit, i.e. outer sleeve and axle.

FIG. 2 shows the movement damper according to FIG. 1 in a perspective view.

FIG. 3 shows a top view of the movement damper according to FIG. 1 from the side of the outer sleeve;

FIG. 4 shows a section along the line IV-IV from FIG. 3 with flanges which are arranged rectangular in their section;

FIG. 5 shows a modification of the arrangement according to FIG. 4 with flanges which are rounded at their head surface;

FIG. 6 shows the outer sleeve alone;

Figure 7:
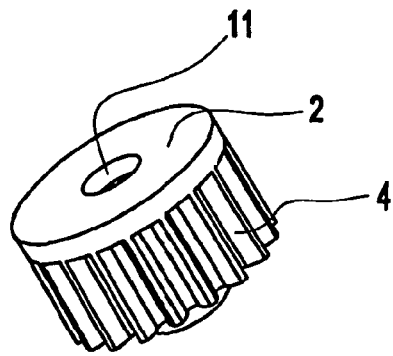
FIG. 7 shows the outer sleeve shown in FIG. 6 in a perspective view.

The movement damper 1 shown in FIG. 1 consists out of the outer sleeve 2 and the axle 3. The outer sleeve 2 is provided with gear teeth 4 by means of which the movement damper 1 may be put into rotation. The axle 3 is inserted into the outer sleeve 2 which axle extends out of the outer sleeve 2 with its axle stub 5. The axle 3 is provided with a hexagonal bolt 6 which serves to engage into a further construction part (not shown) and to drive it.

The combination of the outer sleeve 2 and the axle 3 with the hexagonal bolt 4 is clearly to be taken from FIG. 4 to which it is referred in more detail below.

In FIG. 2, the movement damper shown in FIG. 1 is represented in a perspective view.

FIG. 3 shows a top view of the movement damper 1 as viewed to the open side of the gear teeth 4.

FIG. 4 shows the combination of the movement damper in a section according to line IV-IV of FIG. 3. FIG. 4 clearly shows the adapted arrangement of the outer sleeve 2 and the axle 3. The axle 3 penetrates the outer sleeve 2 completely and engages, so as to say, with both of its flanges 7 and 8 into the material of the outer sleeve wherein, as can be seen, the outer sleeve 2 solidly engages around the axle 3 with both of its flanges 7 and 8. Both flanges 7 and 8 are discoid shaped having a flat flange surface each. It is pointed to the fact that of course also further such flanges can be provided which than are to be installed in a correspondingly extended outer sleeve.

As can be seen from FIG. 4, the material of the outer sleeve 2 solidly encloses the contour of the axle 3 with both of its flanges 7 and 8. The solid connection may be produced in the most simple way thereby that the outer sleeve 2 is formed by injection molding around the axle 3 having both of its flanges 7 and 8. Thereby, a solid engagement of the two parts, i.e. of the outer sleeve 2 and the axle 3, is obtained and, thereby, upon rotation of the axis 3 with respect to the outer sleeve 2, a corresponding friction mainly in the area of the flanges 7 and 8 is obtained which is also desired. In the embodiment selected here, the outer sleeve 2 consists out of plastics which is injection molded about the axle 3 and which thereby solidly engages the contours of the axle 3 automatically.

Because of the design of the flanges 7 and 8 with their flat flange surfaces 9/10 and 9'/10' and the same diameter of the flanges 7 and 8, upon cooling down of the outer sleeve 2, a contraction of the material of the outer sleeve 2 between the two flanges 7 and 8, and, thereby, a pressure onto the flat flange surfaces 9 and 10' facing to the outside of the flanges 7 and 8 upon simultaneous contraction of the facing, flat, inner surfaces 10 and 9' of the two flanges 7 and 8 is resulting, wherein these effects are compensating each other and practically no friction change between the outer sleeve 2 and the axle 3 is coming up. However, if the material of the outer sleeve 2 expands due to rising temperature, a corresponding pressure to the inner flange surfaces 9' and 10 of both of the flanges 7 and 8 is build up between both of the flanges 7 and 8. However, since this has only a slight effect on the side of their outer flange surfaces 9 and 10' because of the unrestricted expansion of the material of the outer sleeve, the expansion remains predominately in the intermediate space between both of the flanges 7 and 8 such that, also in this case, the amount of the mentioned frictional forces remains nearly constant. In any case, it has been proven in practice that a temperature change effecting the plastics material of the outer sleeve 2 has practically no effect with respect to the slipper coupling action because of the shown arrangement of the axle 3 with both of the flanges 7 and 8.

In FIG. 5, there is also shown a section through the movement damper similar to the one according to FIG. 4 wherein, however, the head surfaces of the flanges 7 and 8 are rounded which avoids particular pressure peaks at any edges of the flanges 7 and 8.

In FIG. 6, the outer sleeve 2 is shown on itself which comprises the gear teeth 4. In FIG. 7 the same outer sleeve is represented in a perspective view. FIG. 7 shows, furthermore, the round through hole 11 through which the axle 3 is extending upon assembly.

Figure 8:
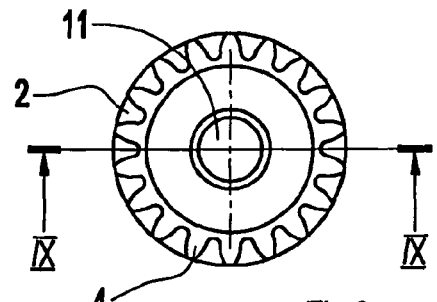
FIG. 8 shows a top view on the outer sleeve according to FIG. 6 as viewed from the open side of the teeth of the gear according to FIG. 6.

FIG. 8 shows a top view onto the outer sleeve according to FIG. 7 as seen from the side of the open flanks of the gear teeth 4.

Figure 9:
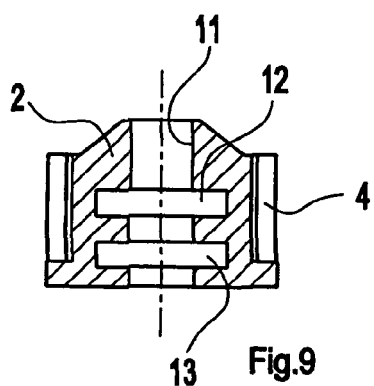
FIG. 9 shows a section through the outer sleeve according to FIG. 8 along the line IX-IX.

FIG. 9 shows a section through the outer sleeve 2 along the line IX-IX of FIG. 8 with the ring channels 12 and 13 which take up the flanges 7 and 8 upon axle 3 being assembled.

Figure 10:
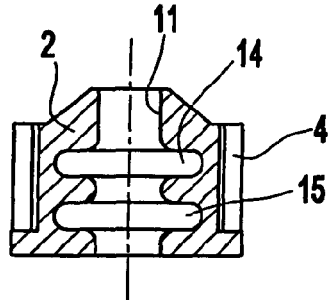
FIG. 10 shows a section similar to the one according to FIG. 9 with rounded head surface of the flanges.

FIG. 10 shows a modification of the drawing according to FIG. 9 in which the ring channels 14 and 15 extend rounded to the outside in order to be able to take up correspondingly rounded flanges.

Figure 11:
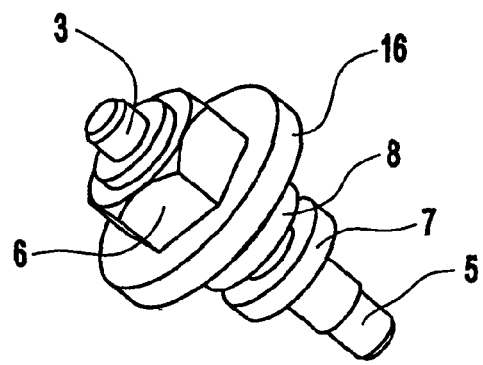
FIG. 11 shows the axle in perspective view.

In FIG. 11, the axle 3 is shown which comprises, on its one side, the hexagonal bolt 6 and, on its other side, the axle stub 5. Furthermore, the axle 3 carries both of the flanges 7 and 8. FIG. 11 shows, furthermore, the ring flange 16 (see also FIGS. 2 and 4) which forms a kind of delimitation between the areas of the axle 3, i.e. between the area with the hexagonal bolt 6 and the area with the flanges 7 and 8.

Figure 12:
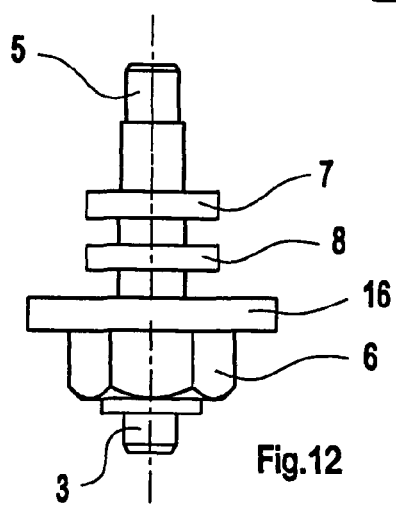
FIG. 12 shows the axle according to FIG. 11 in side view having flanges with rectangular cross section.
Figure 13:
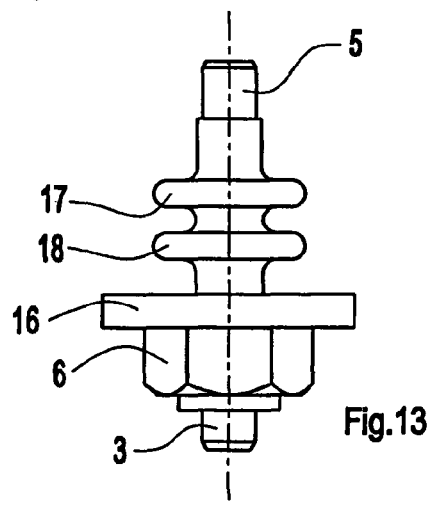
FIG. 13 shows a modification of the axle according to FIG. 12 having flanges with rounded head surface.

In both FIGS. 12 and 13, the axle 3 is shown in side view wherein FIG. 12 is about an axle having rectangular shaped flanges 7 and 8, whereas FIG. 13 is about flanges 17 and 18 which are rounded.

The invention claimed is:

1. A rotational movement damper comprising:
    an outer sleeve having an axial hole and at least two identical annular channels extending radially outward from the axial hole, each of the identical annular channels having flat upper and lower counter surfaces; and
    an axle having at least two identical discoidal flanges with flat upper and lower flange surfaces which fit into the outer sleeve and is mounted to rotate in the outer sleeve,
    wherein the identical discoidal flanges of the axle and the identical annular channels have outer diameters that are equal, and the flat upper and lower flange surfaces of the identical discoidal flanges and the flat upper and lower counter surfaces of the identical annular channels have planar areas that are equal,
    so that when the axle and the outer sleeve are mounted together, the axle is firmly engaged by the outer sleeve, in a way that the flat upper and lower flange surfaces of each of the identical discoidal flanges face against a corresponding one of the flat upper and lower counter surfaces of the corresponding identical annular channels, and
    on counter-rotation of the outer sleeve and the axle, the rotational movement damper acts as a slipper clutch, in which friction between the outer sleeve and the axle during mutual rotation is overcome when a torque on the rotational movement damper exceeds a predetermined amount, and
    wherein at least one of the outer sleeve and the axle of the rotational movement damper is formed of plastic and the outer sleeve comprises a plurality of teeth evenly spaced on an outer circumference of the outer sleeve.

2. The rotational movement damper according to claim 1, wherein each of the identical discoidal flanges is formed with a rounded head surface around an outer circumference thereof.

3. The rotational movement damper according to claim 2, wherein when a vertical cross-section of the discoidal flanges is viewed, the rounded head surface of each of the identical discoidal flanges has a semi-circular shape which extends between the flat upper and lower flange surfaces.

4. The rotational movement damper according to claim 2, wherein the identical discoidal flanges have shapes that are a converse of shapes of the identical annular channels, so that a bottom surface and the counter surfaces of the identical annular channels fit against the head surface and the flat upper and lower flange surfaces of the axle.

5. The rotational movement damper according to claim 1, wherein each of the identical discoidal flanges is formed with a cylinder-shaped circumference.

6. The rotational movement damper according to claim 5, wherein when a vertical cross-section of the identical discoidal flanges is viewed, the cylinder-shaped circumference of each of the identical discoidal flanges has a linear shape which extends between the flat upper and lower flange surfaces.

7. The rotational movement damper according to claim 5, wherein the identical discoidal flanges have shapes that are a converse of shapes of the identical annular channels, so that a bottom surface and the counter surfaces of the identical annular channels fit respectively against the cylinder-shaped circumference and the flat upper and lower flange surfaces of the axle.

8. The rotational movement damper according to claim 1, wherein the axle is configured so that when the outer sleeve is mounted on the axle a gap exists between the outer sleeve and a ring flange of the axle.

9. The rotational movement damper according to claim 1, since at least one of the outer sleeve and the axle of the rotational movement damper is formed of the plastic, a frictional force between the axle and the outer sleeve is able to remain substantially constant during an expansion or a contraction of the outer sleeve and the axle caused by a temperature change.

10. The rotational movement damper according to claim 1, wherein the teeth are arranged in a linear direction along a portion of an outer circumference of the outer sleeve,
wherein each of the teeth arranged in the linear direction on one lateral side of the outer sleeve is directly opposite another one of the teeth on an opposite lateral side of the outer sleeve.

11. The rotational movement damper according to claim 1, wherein a portion of the outer sleeve below the teeth has a uniform circular outer surface.

12. A rotational movement damper, comprising:
an outer sleeve having an axial hole and at least two annular channels extending radially outward from the axial hole, each of the annular channels having flat upper and lower counter surfaces; and
an axle having at least two discoidal flanges with flat upper and lower flange surfaces which fits into the outer sleeve and is mounted to rotate in the outer sleeve,
wherein the discoidal flanges of the axle and the annular channels have diameters that are equal, and the flat flange surfaces of the discoidal flanges and the counter surfaces of the annular channels have planar areas that are equal,
wherein when the axle is fitted into the outer sleeve, the flat flange surfaces of each of the discoidal flanges face against the flat counter surfaces of the corresponding annular channels, and
on counter-rotation of the outer sleeve and the axle, the rotational movement damper acts as a slipper clutch, in which friction between the outer sleeve and the axle during mutual rotation is overcome when a torque on the rotational movement damper exceeds a predetermined amount, and
wherein at least one of the outer sleeve and the axle of the rotational movement damper is formed of plastic,
wherein the axle includes:
a stub on one end thereof which projects from one end of the outer sleeve, and
a ring flange and a hex-bolt head on an opposite end thereof which projects from an opposite end of the outer sleeve.

13. The rotational movement damper according to claim 12, wherein the ring flange has a diameter larger than each of the diameters of the discoidal flanges of the axle and an outer diameter of the outer sleeve.

14. A method of making a rotational movement damper, comprising:
forming an outer sleeve with an axial hole and at least two identical annular channels extending radially outward from the axial hole, each of the identical annular channels having flat upper and lower counter surfaces; and
forming an axle with at least two identical discoidal flanges with flat upper and lower flange surfaces which are adapted to be fit into the outer sleeve and to be mounted to rotate in the outer sleeve,
wherein the identical discoidal flanges of the axle and the identical annular channels have outer diameters that are equal, and the flat upper and lower flange surfaces of the identical discoidal flanges, and the flat upper and lower counter surfaces of the identical annular channels have planar areas that are equal,
so that when the axle and the outer sleeve are mounted together, the axle is firmly engaged with the outer sleeve, in a way that the flat upper and lower flange surfaces of each of the identical discoidal flanges face against a corresponding one of the flat upper and lower counter surfaces of the corresponding identical annular channels, and
on counter-rotation of the outer sleeve and the axle, the rotational movement damper acts as a slipper clutch, in which friction between the outer sleeve and the axle during mutual rotation is overcome when a torque on the rotational movement damper exceeds a predetermined amount,
wherein at least one of the outer sleeve and the axle is formed of plastic, and
since at least one of the outer sleeve and the axle of the rotational movement damper is formed of plastic, a friction force between the axle and the outer sleeve is able to remain substantially constant during an expansion or a contraction of the outer sleeve and the axle caused by a temperature change,
wherein teeth are arranged in a linear direction along a portion of an outer circumference of the outer sleeve, and each of the teeth is directly opposite of the teeth of an opposite side of the outer sleeve.

15. The method of making the rotational movement damper according to claim 14, the method comprising:
slanting an uppermost portion of the outer sleeve inwardly from a lower edge thereof, and
forming an outer diameter of a lowermost part of the outer sleeve to be greater than inner diameters of the identical annular channels of the outer sleeve.

16. The method of making the rotational movement damper according to claim 14, the method comprising:
mounting one of the outer sleeve and the axle onto the other of the outer sleeve and the axle by injection molding so that when the outer sleeve is mounted on the axle, a gap exists between the outer sleeve and a ring flange of the axle.

17. The method of making the rotational movement damper according to claim 14, the method comprising:
forming the outer sleeve with a plurality of teeth,
the teeth being arranged in a linear direction along a portion of an outer circumference of the outer sleeve,
wherein each of the teeth arranged in the linear direction on one lateral side of the outer sleeve is directly opposite another one of the teeth on an opposite lateral side of the outer sleeve.

18. The method of making the rotational movement damper according to claim 14, the method comprising:
forming a portion of the outer sleeve with teeth, and
forming another portion of the outer sleeve below the teeth with a uniform circular outer surface.

* * * * *